United States Patent
Onosato

(10) Patent No.: US 7,063,779 B2
(45) Date of Patent: Jun. 20, 2006

(54) METHOD FOR MANUFACTURING METAL-COATED OPTICAL FIBER

(75) Inventor: Yoichi Onosato, Tokyo (JP)

(73) Assignee: Sumitomo Metal Mining Co. Ltd., Tokyo (JP)

( * ) Notice: Subject to any disclaimer, the term of this patent is extended or adjusted under 35 U.S.C. 154(b) by 245 days.

(21) Appl. No.: 10/734,242

(22) Filed: Dec. 15, 2003

(65) Prior Publication Data

US 2004/0129571 A1    Jul. 8, 2004

(30) Foreign Application Priority Data

Dec. 24, 2002    (JP) .............................. 2002/371789

(51) Int. Cl.
*C25D 5/54*    (2006.01)
*C23C 28/02*    (2006.01)

(52) U.S. Cl. ...................... 205/187; 205/149; 205/159; 205/187

(58) Field of Classification Search ................ 205/183, 205/184, 187, 220, 222, 266, 271, 221, 159, 205/149

See application file for complete search history.

(56) References Cited

U.S. PATENT DOCUMENTS 5,380,559 A * 1/1995 Filas et al. .................. 427/305
5,533,158 A * 7/1996 Han et al. ..................... 385/88
6,251,252 B1 * 6/2001 Chen ........................... 205/163
2002/0110328 A1 * 8/2002 Bischel et al. ................ 385/49
2003/0039458 A1 * 2/2003 Miller et al. ................ 385/128
2003/0053784 A1 * 3/2003 LaBrake et al. ............ 385/128

FOREIGN PATENT DOCUMENTS

JP    7-27952    1/1995

* cited by examiner

*Primary Examiner*—Nam Nguyen
*Assistant Examiner*—Luan V. Van
(74) *Attorney, Agent, or Firm*—Armstrong, Kratz, Quintos, Hanson & Brooks, LLP

(57) ABSTRACT

The optical fiber manufacturing method according to the present invention is characterized by having the steps of forming, on the peripheral surface of a bare fiber having been exposed by removing a resin cover and on which a metallic coating has not been provided, a subbing layer consisting of an electroless Ni plating layer and an electrolytic Au plating layer; subjecting the bare fiber on which the subbing layer has been formed, to end face treatment by means of an optical-fiber cleaver to expose an end face portion of the bare fiber; and subjecting the bare fiber on which the end face treatment has been carried out, to electrolytic plating to form a metallic coating as a surface layer, consisting of an electrolytic Ni plating layer and an electrolytic Au plating layer.

5 Claims, 2 Drawing Sheets

METHOD FOR MANUFACTURING METAL-COATED OPTICAL FIBER

BACKGROUND OF THE INVENTION

1. Field of the Invention

This invention relates to a method for manufacturing an optical fiber that is optically connected with an optical element used in optical communication, optical measurement and so forth which is held in a housing of an optical communication module. More particularly, this invention relates to an optical fiber manufacturing method which can simply manufacture an optical fiber in which a bare-fiber peripheral surface exposed by removing a resin cover has been coated with a metal and a bare-fiber end has been end-face-treated.

2. Description of the Related Art

Optical communication modules in which optical elements are held in housings have a hermetically sealed structure for making the interior of each housing shut off from the outside, in order to prevent the optical elements from being broken because of moisture condensation or the like.

On this hermetically sealed structure, many methods have ever been proposed and put into practical use. For example, a method is employed in which, as shown in FIG. 2, when a metallic sleeve 1 is used to insert therethrough an optical fiber 10 with resin covering to the interior of a housing 20 of an optical communication module, a resin cover 11 is removed at the part corresponding to a through-hole of the metallic sleeve 1 to make a bare fiber 12 of the optical fiber 10 exposed, where the surface of the bare fiber 12 thus exposed is coated with a metal, the bare fiber 12 is sealed with a solder 2 at the part coated with a metal, and the metallic sleeve 1 is further attached to the housing 20 of the optical communication module with a solder 3 or by seam welding. A method is also employed in which, without use of the metallic sleeve 1, the bare fiber 12 at its part coated with a metal is inserted to the through-hole provided in the housing 20 of the optical communication module, and the bare fiber 12 is directly attached to the housing 20 with a solder to seal up the latter.

Also employed as a method for achieving optical joining between an optical element (not shown) held in the housing 20 and the optical fiber 10, a method is employed in which an end face of the bare fiber 12 exposed by removing the resin cover 11 of the optical fiber 10 is subjected to polishing.

Incidentally, as to a method for fastening the optical fiber 10 to the interior of the housing 20 of the optical communication module, a method is employed in which an end face of the bare fiber 12 exposed by removing the resin cover 11 is polished and this bare fiber 12 is passed through a capillary 4 made of a synthetic quartz glass or a metal, and fastened with an adhesive or by soldering, which is also optically adjusted to the optical element, and thereafter the capillary 4 is fastened to the interior of the housing 20 of the optical communication module. A method is also employed in which the bare fiber 12 is fastened to the capillary 4 and an end face of the bare fiber 12 is polished, which is also optically adjusted to the optical element, and thereafter the capillary 4 is fastened to the interior of the housing 20 of the optical communication module.

In the optical fiber in such a module hermetically sealed with a solder in this way, the bare fiber 12 exposed by removing the resin cover 11 has been coated with a metal on its peripheral surface as described above and also the end face of the bare fiber 12 has precisely been polished (end-face-treated) in order to secure optical connection to the optical element.

Now, where the peripheral surface of the bare fiber 12 is provided with no resin cover, the end face treatment for the bare fiber 12 can be carried out with ease by means of an existent optical-fiber cleaver which applies cleavage cutting. Accordingly, as to the end face treatment for the bare fiber 12, manufacturing operation can be made simple if the treatment making use of the optical-fiber cleaver can be employed without employing the above polishing.

However, in the above optical fiber whose bare fiber 12 surface has been metal-coated for the purpose of hermetic sealing, an electroless Ni coating layer and an electrolytic Au coating layer for example are formed as a subbing layer and a surface layer, respectively, of the metallic coating, having a layer thickness of about 1 µm to 3 µm as a whole. Hence, where the end face treatment is carried out using the optical-fiber cleaver, it is difficult to make a notch cut (strike mark or blade mark) necessary for cleavage, because the bare fiber of the optical fiber stands protected with the metallic coating, so that its rupture cross-section can not be treated to have a end face shape suited for the light input. There has been such a problem. Even if a end face shape suited for the light input has been obtained, there has also been a problem that the metallic foil (coating fin) that forms at the rupture cross-section of the metallic coating covers the light-incident end face of the optical fiber unwantedly, or that, because of such a rupture cross-section, the metallic coating formed on the bare fiber may come with time to tend to come off.

To solve such problems, as disclosed in Japanese Patent Application Laid-open No. H07-27952, a method is proposed in which, when an optical-fiber bare fiber is treated to provide a metallic coating, a mask material is beforehand used at the part to be cut with an optical-fiber cleaver, or a method in which, after the optical-fiber bare fiber has been treated to provide a metallic coating, the metallic coating is etched away at the part to be cut. Both the methods, however, have had a difficulty that they make manufacturing steps complicate.

SUMMARY OF THE INVENTION

The present invention has been made taking note of such problems. Accordingly, an object of the present invention is to provide an optical-fiber manufacturing method which can manufacture optical fibers more simply than any conventional methods in respect of an optical fiber a bare fiber of which is provided on its peripheral surface with a metallic coating which enables hermetic sealing with solder, and has a bare-fiber end face shape which is necessary for optical connection with an optical element.

That is, the present invention provides a method for manufacturing an optical fiber having a bare fiber and a resin cover with which the peripheral surface of the bare fiber is covered except for part of the fiber-end side of the bare fiber; the bare fiber being exposed by removing the resin cover at the part of the fiber-end side thereof and being provided with a metallic coating on its peripheral surface excluding an end face portion of the bare fiber; the method comprising:

a subbing-layer formation step of forming, on the peripheral surface of the bare fiber having been exposed by removing the resin cover and on which the metallic coating has not been provided, a metallic subbing layer consisting of an electroless plating layer with a thickness necessary for electrolytic plating and an electrolytic plating layer;

an end face treatment step of subjecting the bare fiber on which the subbing layer has been formed, to end face treatment by means of an optical-fiber cleaver to expose an end face portion of the bare fiber; and a surface layer formation step of subjecting the bare fiber on which the end face treatment has been carried out, to electrolytic plating to form the metallic coating as a surface layer.

DESCRIPTION OF THE PREFERRED EMBODIMENTS

Figure 1:
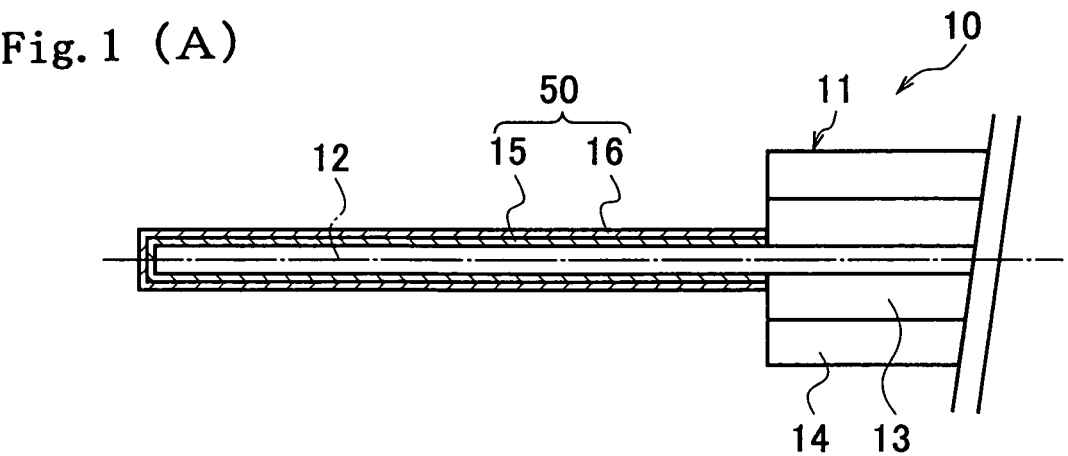
FIGS. 1(A) to 1(C) illustrate optical-fiber manufacturing steps according to the present invention.
Figure 1:
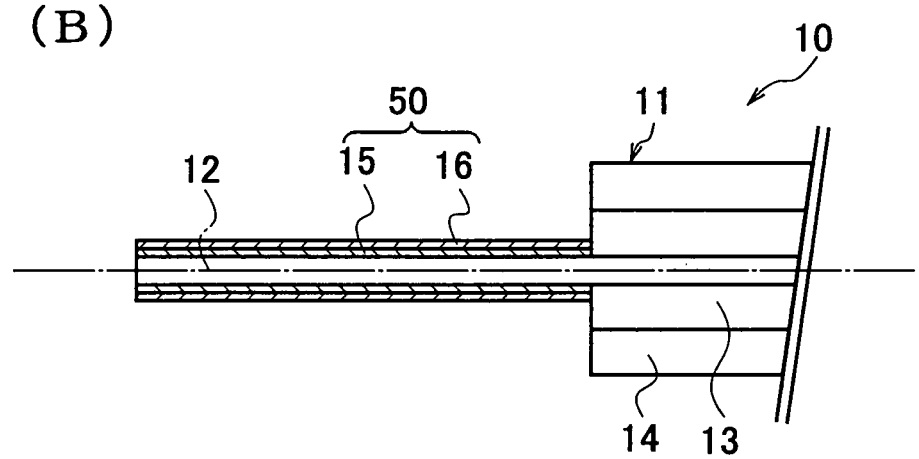
Figure 1:
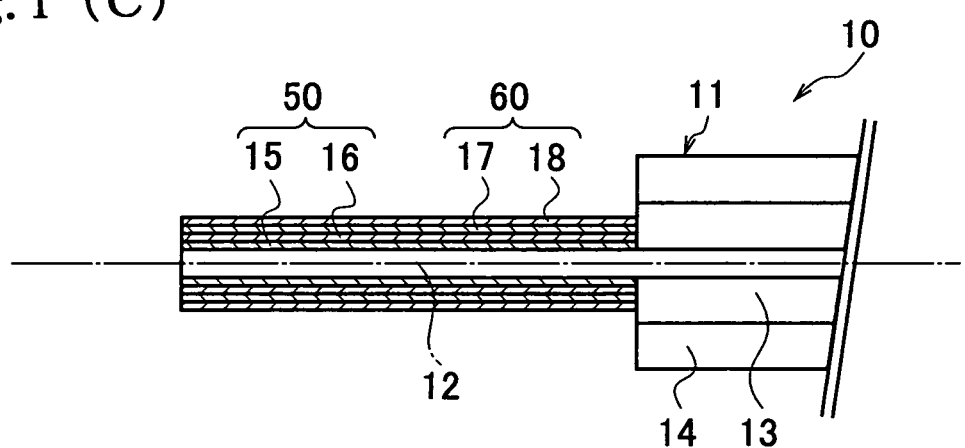
Figure 2:
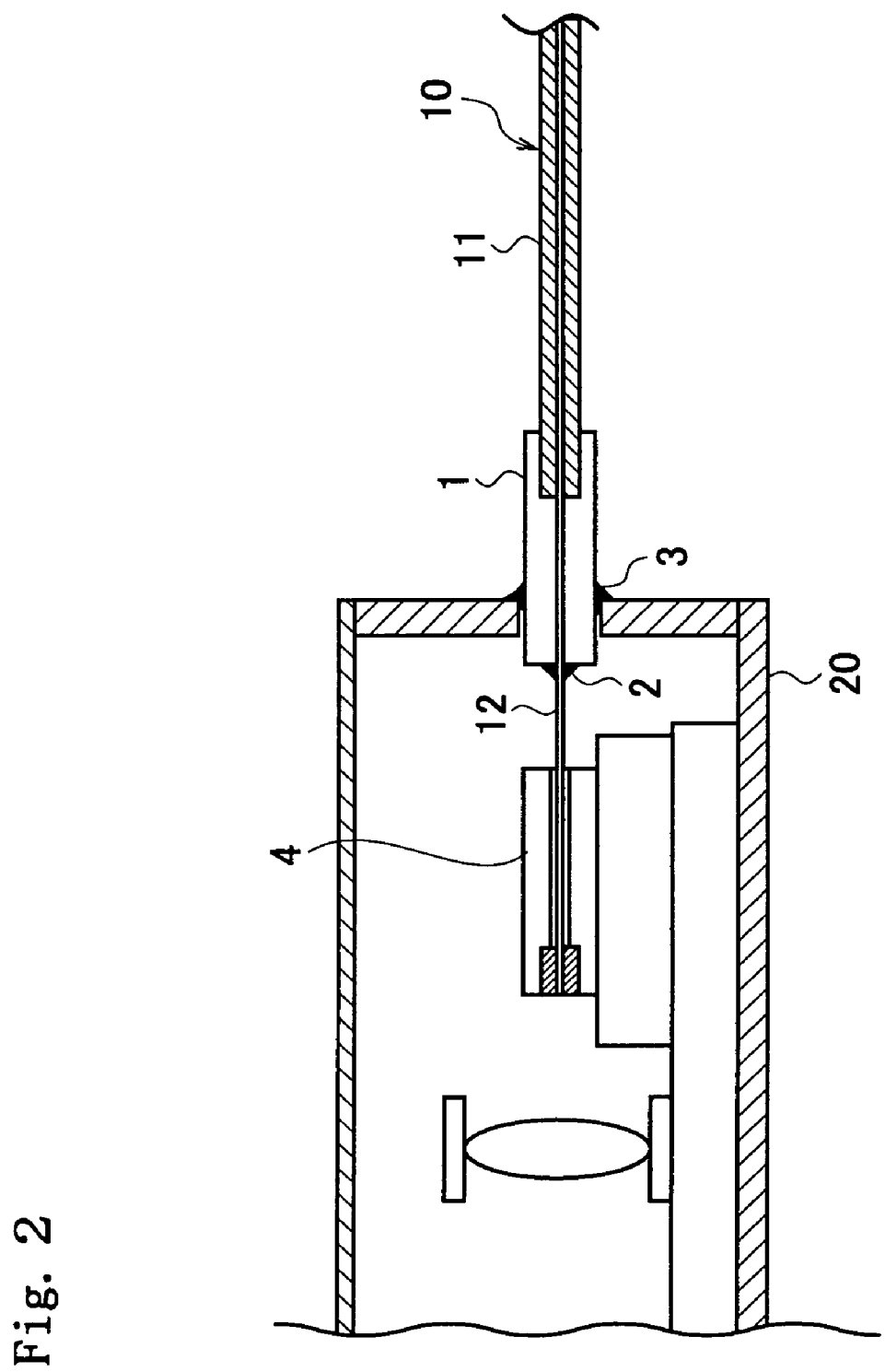
FIG. 2 illustrates a hermetically sealed structure of an optical communication module.

The present invention is described below in detail.

The optical-fiber manufacturing method according to the present invention is first characterized by forming, on the peripheral surface of a bare fiber having been exposed by removing a resin cover and on which a metallic coating has not been provided, a metallic subbing layer consisting of an electroless plating layer with a thickness necessary for electrolytic plating and an electrolytic plating layer; thereafter subjecting the resultant bare fiber to end face treatment making use of a optical-fiber cleaver; and then subjecting the resultant bare fiber to electrolytic plating to form a metallic coating as a surface layer.

In this manufacturing method, the metallic coating as a subbing layer can be formed in a layer thickness set small, because the metallic coating as a surface layer is formed after the end face treatment making use of an optical-fiber cleaver. Hence, even though the subbing layer metallic coating is present on the bare-fiber peripheral surface, the bare fiber can well be ruptured by means of the optical-fiber cleaver and also the metallic foil by no means forms on the rupture cross-section.

In addition, since the metallic coating as a surface layer is formed by electrolytic plating after the end face treatment, the metallic coating is by no means formed on the bare-fiber end face (i.e., light-incident face) where no subbing layer is present.

Thus, an optical fiber can be manufactured with ease in which the bare-fiber peripheral surface exposed by removing the resin cover has been coated with a metal and the fiber end has been end-face-treated.

Here, the subbing layer consisting of an electroless plating layer with a thickness necessary for electrolytic plating and an electrolytic plating layer may have any desired layer constitution. It may preferably be constituted of a combination of an electroless Ni (nickel) plating layer and an electrolytic Au (gold) plating layer. This is because the electroless Ni plating layer has properties that it has good adhesion to quartz constituting the bare fiber, and also has so high hardness as to be advantageous for the cutting of the bare fiber by cleavage cutting, and also because the electrolytic Au plating layer has properties that it prevents oxidation of the electroless Ni plating layer and has good adherence to the electrolytic plating layer (surface layer) after the cleavage cutting.

In the case when the subbing layer is constituted of the electroless Ni plating layer and the electrolytic Au plating layer, the electroless Ni plating layer may have a thickness set within the range of from 0.01 μm to 1.5 μm. This is because, if it has a thickness of less than 0.01 μm, the layer may be so thin as to bring about a difficulty in the subsequent electrolytic plating, and, if on the other hand it has a thickness of more than 1.5 μm, a bare-fiber end face which is especially good for the light incidence may be obtained with difficulty when the end face treatment is carried out using the optical-fiber cleaver. The electrolytic Au plating layer may also have a thickness set within the range of from 0.03 μm to 0.1 μm. This is because, if it has a thickness of less than 0.03 μm, it may be difficult for the layer to cover the electroless Ni plating layer completely, and, if on the other hand it has a thickness of more than 0.1 μm, a good bare-fiber end face may be obtained with difficulty when the end face treatment is carried out using the optical-fiber cleaver.

Then, as the surface layer electrolytic plating layer, it may appropriately be selected taking account of its wettability to solder, and may preferably be constituted of an electrolytic Ni plating layer and an electrolytic Au plating layer. In the case when the surface layer electrolytic plating layer is constituted of the electrolytic Ni plating layer and the electrolytic Au plating layer, if, e.g., Au/20Sn soldering is carried out, a phenomenon called "solder erosion" may occur in which Au and Ni dissolve in molten solder. If such a "solder erosion" phenomenon occurs to make the quartz exposed to the bare-fiber surface, a poor solder wettability may result. Accordingly, the electrolytic Ni plating layer constituting the surface layer may have a thickness of 0.5 μm or more. It, however, may desirably have a thickness of 4.0 μm or less because, if it has a thickness of more than 4.0 μm, such a layer may cause a non-reversibility that the state of being bent is maintained when the optical fiber is bent. The surface layer electrolytic Au plating layer also has the function to prevent oxidation of the electrolytic Ni plating layer positioned beneath it and improve its solder wettability. Then, since the oxidation of the electrolytic Ni plating layer makes the layer have a poor solder wettability, the electrolytic Au plating layer may preferably have a thickness of 0.05 μm or more. The electrolytic Au plating layer also has so high rate of dissolution in solder that it improves solder wettability vastly. However, even if an electrolytic Au plating layer having a thickness of more than 1.0 μm is provided, the effect of preventing oxidation and improving solder wettability is not so enhanced. Accordingly, from an economical viewpoint, the electrolytic Au plating layer may preferably have a thickness of 1.0 μm or less.

In the case when the surface layer electrolytic plating layer is constituted of the electrolytic Ni plating layer and the electrolytic Au plating layer, it is preferable for them to be Ni and Au plating layers having a purity of 99.9% or more.

The present invention is described below in greater detail by giving Examples.

EXAMPLES 1 to 7 & COMPARATIVE EXAMPLES 1, 2

As shown in FIG. 1(A), a resin cover (constituted of a primary resin cover 13 and a secondary resin cover 14) of an optical fiber 10 was peeled and removed to lay bare a bare fiber 12 of 125 μm in line diameter and 30 mm in length. Thereafter, the surface of this bare fiber 12 was subjected to pretreatment such as alkali cleaning, acid cleaning and chemical polishing.

Next, this bare fiber 12 was immersed in a solution containing a Sn (tin) salt, a coupling agent and so forth to condition its surface. Thereafter, this bare fiber 12 was made catalytic with a Pd (palladium) salt solution, and then subjected to electroless Ni plating using a reduction type electroless plating bath to form an electroless Ni plating layer 15 of a subbing layer 50. Thereafter, its surface was electrolytically plated with high-purity Au using a commercially available pure-Au plating solution to form an electrolytic Au plating layer 16 of the subbing layer 50.

Following the above procedure, electroless Ni plating layers 15 and electrolytic Au plating layers 16 were formed as subbing layers 50 in optical fibers of Examples 1 to 7. Their layer thicknesses are shown in Table 1 below.

As comparative examples, prepared were an optical fiber of Comparative Example 1 in which an electroless Ni plating layer, an electrolytic Ni plating layer and an electrolytic Au plating layer of 0.05 µm, 2.0 µm and 0.2 µm, respectively, in layer thickness which were feasible for hermetic sealing with solder were provided in this order on the bare-fiber peripheral surface, and an optical fiber of Comparative Example 2 which only an electroless Ni plating layer of 0.5 µm in layer thickness was provided as a subbing layer on the bare-fiber peripheral surface.

Next, the instrument setting of a commercially available optical-fiber cleaver (Oxford Fiber Ltd., AFC-2008) was made in optimum conditions in respect of the layer thickness in each of Examples 1 to 7 and Comparative Examples 1 and 2. Thereafter, end face treatment was carried out as shown in FIG. 1(B) to expose an end face portion of each bare fiber. The end faces of the bare fibers in Examples 1 to 7 and Comparative Examples 1 and 2, having been thus subjected to end face treatment, were each observed on a scanning electron microscope (SEM). As the result, end faces satisfactory as light-incident faces were found to have been obtained except Comparative Example 1. The end face in Comparative Example 1 had a rough rupture cross-section, and the metallic foil that formed at the rupture cross-section of the metallic coating was seen to be present in the vicinity of the end face. Also, light was transmitted through the optical fibers of Examples 1 to 7 and Comparative Examples 1 and 2, having been thus subjected to end face treatment, to evaluate their optical characteristics to find that, in the case of Comparative Example 1, the modal shape of light beams stood disordered. Results of these are also shown in Table 1 below.

Next, the surface of the subbing layer of each optical fiber of Examples 1 to 7 and Comparative Example 2, except Comparative Example 1, was electrolytically plated with high-purity Ni using a sulfamic-acid Ni plating solution to form an electrolytic Ni plating layer 17 of a surface layer 60 as shown in FIG. 1(C). Its surface was further electrolytically plated with high-purity Au using a commercially available pure-Au plating solution to form an electrolytic Au plating layer 18 of the surface layer 60.

Thus, optical fibers of Examples 1 to 7 and Comparative Example 2 each provided with an electrolytic Ni plating layer 17 of 2.0 µm in layer thickness and an electrolytic Au plating layer 18 of 0.2 µm in layer thickness which constituted the surface layer 60 were manufactured by the method described above. As the result, in Examples 1 to 7, good surface layers were formed by electrolytic plating layer. However, in Comparative Example 2, no good surface layer was formed by electrolytic plating, resulting in a non-uniform surface layer. The results of these are also shown in Table 1 below.

Next, the bare fibers of the optical fibers of Examples 1 to 7 and Comparative Example 2 were each inserted to a through-hole of 135 µm in inner diameter which was provided in a metallic sleeve made of stainless steel, and the bare fiber and the metallic sleeve were soldered with an AuSn solder. Here, metallic sleeve was plated with Ni/Au in order to improve the solder wettability of the AuSn solder to the metallic sleeve.

Then, on each optical fiber attached to the metallic sleeve, how the soldered part was hermetic was examined by a He (helium) leak test to find that no leak was seen and good solderability was ascertained in the optical fibers of Examples 1 to 7, whereas a leak was seen and no good solderability was achievable in the optical fiber of Comparative Example 2. The results of these are also shown in Table 1 below.

TABLE 1

| | Subbing layer Layer thickness of: | | | | Surface layer Layer thickness of: | | State | |
| --- | --- | --- | --- | --- | --- | --- | --- | --- |
| | Electroless Ni plating layer (µm) | Electrolytic Au plating layer (µm) | State of end face after cutting | Optical characteristics | Electrolytic Ni plating layer (µm) | Electrolytic Au plating layer (µm) | of film formation of surface layer | Solder wettability |
| Example: | | | | | | | | |
| 1 | 0.01 | 0.05 | excellent | excellent | 2.0 | 0.2 | excellent | excellent |
| 2 | 0.05 | 0.05 | excellent | excellent | 2.0 | 0.2 | excellent | excellent |
| 3 | 0.1 | 0.05 | excellent | excellent | 2.0 | 0.2 | excellent | excellent |
| 4 | 0.5 | 0.05 | excellent | excellent | 2.0 | 0.2 | excellent | excellent |
| 5 | 1.0 | 0.05 | excellent | good | 2.0 | 0.2 | excellent | excellent |
| 6 | 0.5 | 0.1 | excellent | good | 2.0 | 0.2 | excellent | excellent |
| 7 | 1.5 | 0.05 | excellent | good | 2.0 | 0.2 | excellent | excellent |
| Comparative Example: | | | | | | | | |
| 1 | 0.05 | electrolytic Ni: 2.0 electrolytic Au: 0.2 | poor | poor | — | — | — | — |
| 2 | 0.5 | — | excellent | excellent | (2.0) | (0.2) | non-uniform | poor |

What is claimed is:

1. A method for manufacturing a bare-fiber-metal-coated optical fiber having a bare fiber and a resin cover with which the peripheral surface of the bare fiber is covered except for part of the fiber-end side of the bare fiber; the bare fiber being exposed by removing the resin cover at the part of the fiber-end side thereof and being provided with a metallic coating on its peripheral surface excluding an end face portion of the bare fiber; the method comprising:

a subbing-layer formation step of forming, on the peripheral surface of the bare fiber having been exposed by removing the resin cover and on which the metallic coating has not been provided, a metallic subbing layer consisting of an electroless plating layer with a thickness necessary for electrolytic plating and an electrolytic plating layer, followed by;

an end face treatment step of subjecting the bare fiber on which the subbing layer has been formed, to end face treatment by means of an optical-fiber cleaver to expose an end face portion of the bare fiber; and followed by a surface layer formation step of subjecting the bare fiber on which the end face treatment has been carried out, to electrolytic plating to form the metallic coating as a surface layer.

2. The bare-fiber-metal-coated optical fiber manufacturing method according to claim 1, wherein said subbing layer consists essentially of an electroless nickel plating layer of from 0.01 μm to 1.5 μm in thickness and an electrolytic gold plating layer of from 0.03 μm to 0.1 μm in thickness which has been formed on the electroless nickel plating layer.

3. The bare-fiber-metal-coated optical fiber manufacturing method according to claim 1 or 2, wherein said surface layer consists essentially of an electrolytic nickel plating layer and an electrolytic gold plating layer having been formed on the electrolytic nickel plating layer.

4. The bare-fiber-metal-coated optical fiber manufacturing method according to claim 3, wherein said electrolytic nickel plating layer is set in a thickness of from 0.5 μm to 4.0 μm, and said electrolytic gold plating layer in a thickness of from 0.05 μm to 1.0 μm.

5. The bare-fiber-metal-coated optical fiber manufacturing method according to claim 3, wherein said electrolytic nickel plating layer and said electrolytic gold plating layer are constituted of nickel and gold, respectively, each having a purity of 99.9% or more.

* * * * *